United States Patent [19]

Venables

[11] Patent Number: 4,642,918

[45] Date of Patent: Feb. 17, 1987

[54] PLANT EXTRACTOR

[76] Inventor: Charles R. Venables, Wagonwheels, District Lillyfontein, East London, Cape Province, South Africa

[21] Appl. No.: 783,449

[22] Filed: Oct. 2, 1985

[30] Foreign Application Priority Data

Oct. 2, 1984 [ZA] South Africa ............... 84/7747

[51] Int. Cl.$^4$ ............................................. A01B 13/00
[52] U.S. Cl. ...................................... 37/2 R; 254/132
[58] Field of Search ................. 37/2 R; 254/132, 124

[56] References Cited

U.S. PATENT DOCUMENTS

| 242,671 | 6/1881 | McGown | 254/132 |
|---|---|---|---|
| 643,725 | 2/1900 | McCann | 254/132 |
| 809,972 | 1/1906 | McGown | 254/132 |
| 1,640,732 | 8/1927 | Simpson | 254/132 |
| 2,511,657 | 6/1950 | Welch | 37/2 R |
| 2,597,740 | 5/1952 | Lyle, III | 37/2 R |
| 2,613,458 | 10/1952 | Harrell | 37/2 R |
| 3,201,089 | 8/1965 | Napoletano | 37/2 R X |
| 3,802,663 | 4/1974 | Widegren et al. | 37/2 R |
| 3,811,388 | 5/1974 | Campbell | 37/2 R |
| 4,356,644 | 11/1982 | Harkness | 37/2 R |

Primary Examiner—E. H. Eickholt
Attorney, Agent, or Firm—Ladas & Parry

[57] ABSTRACT

A plant extractor which includes a pair of jaws, at least one of the jaws being a displaceable jaw which is movable towards the other of the jaws, a ground engaging member forming a fulcrum and being pivotally attached to the plant extractor, the ground engaging member being linked to the displaceable jaw so that when placed on the ground, the ground engaging member displaces the displaceable jaw towards the other jaw to grip the plant, and a lever operable to pivot the plant extractor about the fulcrum thereby to permit extraction of the plant from the ground.

10 Claims, 4 Drawing Figures

PLANT EXTRACTOR

This invention relates to extracting plants, eg weeds, trees, or the like.

According to the invention there is provided a plant extractor which includes a pair of jaws, at least one of the jaws being a displaceable jaw which is movable towards the other of the jaws, a ground engaging member forming a fulcrum and being pivotally attached to the plant extractor, the ground engaging member being linked to the displaceable jaw so that when placed on the ground the ground engaging member displaces the displaceable jaw towards the other jaw to grip the plant, and a lever operable to pivot the plant extractor about the fulcrum thereby to permit extraction of the plant from the ground.

The other of the jaws may be fixed in which case the lever and the fixed jaw may be integrally formed, eg formed from a length of suitably bent piping. Suitable reinforcing gussets may be provided interconnecting the lever and the fixed jaw. In another embodiment, both jaws may be displaceable towards one another under the control of the ground engaging member.

The displaceable jaw may be constituted by a transverse member directly connected to the ground engaging member.

A guide formation may be provided on the fixed jaw for guiding the displacement of the displaceable jaw.

In one embodiment, the lever may be in the form of a handle for manual operation of the plant extractor. In another embodiment, the lever may have connection means for connecting it to a three point linkage of a tractor. Displacement of the lever may be effected by hydraulic or pneumatic piston and cylinder assemblies.

When used for extracting trees, a support member may be provided extending outwardly from the lever for supporting the tree during extraction. The support member may be V-shaped or have a V-shaped forward end.

Various embodiments of the invention are now described by way of example with reference to the accompanying drawings, in which.

Figure 1:
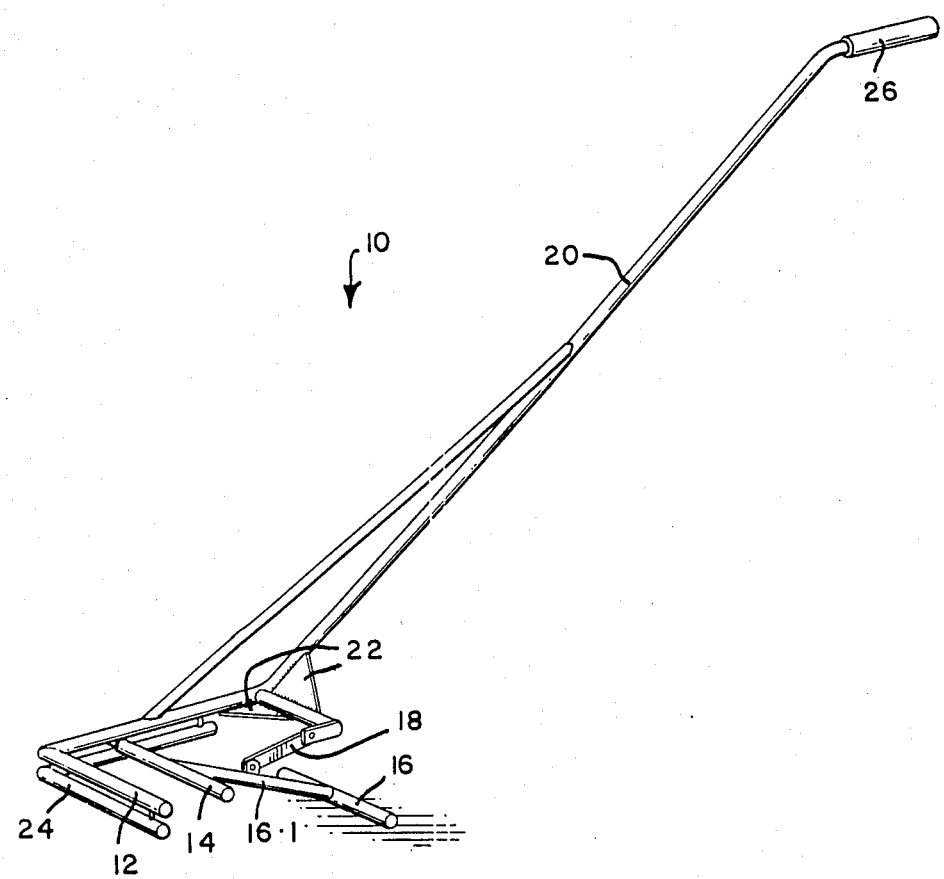
FIG. 1 shows a schematic three dimensional view of a plant extractor in accordance with the invention.

Referring to the drawings, reference numeral 10 generally indicates a plant extractor having, in all these embodiments a fixed jaw 12 and a displaceable jaw 14. If desired, serrations or similar gripping formations may be provided on the jaws. A ground engaging member 16 forms a fulcrum for the extractor and is pivotally attached to the extractor via a linkage 18. The ground engaging member 16 is directly connected to the displaceable jaw 14 by a link 16.1.

A lever 20 is fixed to the fixed jaw 12. The extractor is reinforced by reinforcing gussets 22.

The displaceable jaw 14 is guided by a guide formation 24 extending parallel to the fixed jaw 12.

Figure 2:
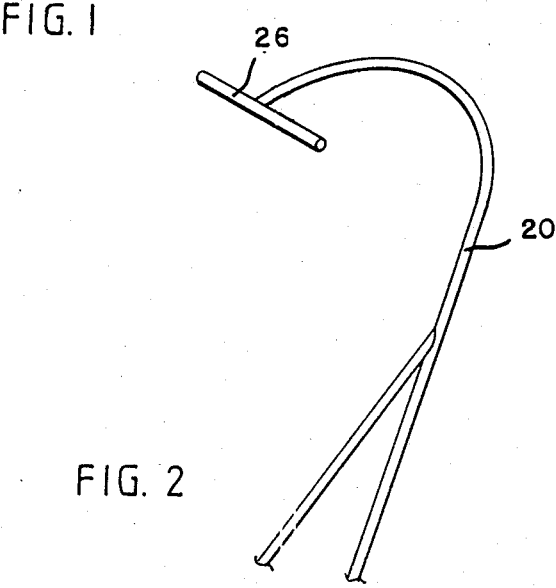
FIG. 2 shows a three dimensional view of a modification of the handle or lever of the FIG. 1 embodiment.

The FIGS. 1 and 2 embodiments are intended for manual operation, the lever 20 terminating in a handle 26. The handle 26 in the FIG. 2 embodiment is curved for ease of operation. The handle 26 may be curved in various ways to suit a particular operator.

Figure 3:
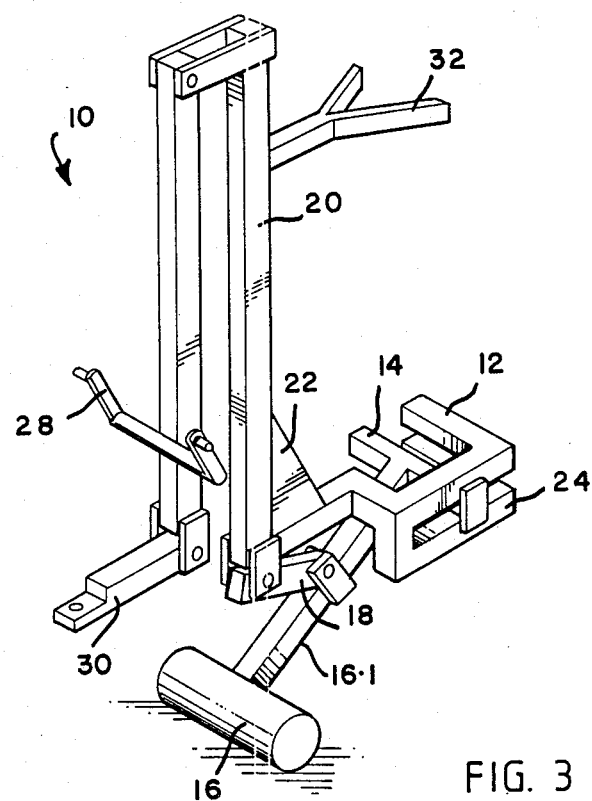
FIG. 3 shows a three dimensional view of a plant extractor intended for connection to the three point linkage of a tractor.

As shown in FIG. 3, the lever can be connected by connection means in the form of a pivotal arm 28 to a three point linkage of a tractor while a bar 30 is connectable to a trailer hitch of the tractor.

In use, the jaws 12 and 14 are placed on opposed sides of a plant to be extracted. By bearing down on the lever 20, the ground engaging member 16 displaces the displaceable jaw 14 towards the fixed jaw 12 to grip the plant. By pivoting the lever 20, the ground engaging member 16 forms a fulcrum and the plant can then be extracted from the ground.

Figure 4:
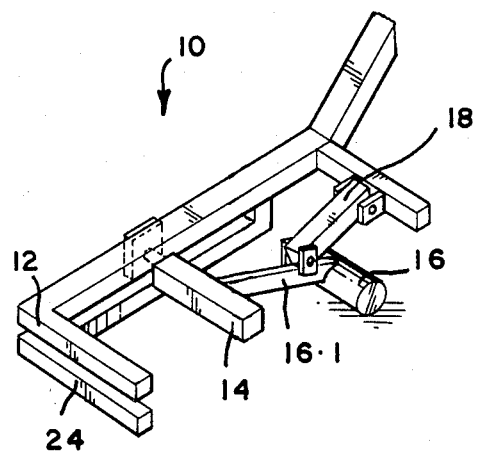
FIG. 4 shows a further three dimensional view of portion of a further form of plant extractor similar to FIG. 3.

In the FIGS. 3 and 4 embodiments, the operation is similar except that the three point linkage of a tractor is used to pivot the lever 20. In addition, a V-shaped support member 32 can be used to support a tree being extracted. Wheels or rollers may be fitted to the ground engaging member 16 to permit transportation of the tree.

The invention illustrated provides a plant extractor which is of simple construction and which it is believed can be used effectively to remove plants.

I claim:

1. A plant extractor which includes a pair of jaws, at least one of the jaws being a displaceable jaw which is movable towards the other of the jaws, a ground engaging member forming a fulcrum and being pivotally attached to the plant extractor, the ground engaging member being linked to the displaceable jaw so that when placed on the ground, the ground engaging member displaces the displaceable jaw towards the other jaw to grip the plant, and a lever operable to pivot the plant extractor about the fulcrum thereby to permit extraction of the plant from the ground.

2. A plant extractor as claimed in claim 1, in which the other of the jaws is fixed and the lever and the fixed jaws are integrally formed.

3. A plant extractor as claimed in claim 2, which includes reinforcing gussets interconnecting the lever and the fixed jaw.

4. A plant extractor as claimed in claim 1, in which the displaceable jaw is constituted by a transverse member directly connected to the ground engaging member.

5. A plant extractor as claimed in claim 2, which includes a guide formation on the fixed jaw for guiding displacement of the displaceable jaw.

6. A plant extractor as claimed in claim 1, in which the lever is in the form of a handle for manual operation of the plant extractor.

7. A plant extractor as claimed in claim 1, in which the lever has connection means for connecting it to a three point linkage of a tractor.

8. A plant extractor as claimed in claim 7, which includes piston and cylinder assemblies for displacing the lever.

9. A plant extractor as claimed in claim 1, which further includes a support member extending outwardly from the lever for supporting a tree during extraction.

10. A plant extractor as claimed in claim 9, in which the support member has a V-shaped forward end.

* * * * *